US008078665B2

(12) United States Patent
Poder et al.

(10) Patent No.: US 8,078,665 B2
(45) Date of Patent: Dec. 13, 2011

(54) SHARING MEDIA CONTENT BASED ON A MEDIA SERVER

(75) Inventors: Jim Poder, Cheltenham, PA (US); Michael J. Cook, Flemington, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 95 days.

(21) Appl. No.: 12/435,053

(22) Filed: May 4, 2009

(65) Prior Publication Data

US 2010/0281093 A1 Nov. 4, 2010

(51) Int. Cl.
G06F 15/16 (2006.01)
(52) U.S. Cl. ......... 709/201; 709/218; 709/217; 709/219
(58) Field of Classification Search .................. 709/201, 709/217, 218, 219
See application file for complete search history.

(56) References Cited

U.S. PATENT DOCUMENTS

| 6,981,045 | B1 | 12/2005 | Brooks |
| 2002/0116501 | A1 | 8/2002 | Ho et al. |
| 2002/0116721 | A1* | 8/2002 | Dobes et al. .................. 725/129 |
| 2002/0141389 | A1 | 10/2002 | Fangman et al. |
| 2004/0172658 | A1 | 9/2004 | Rakib et al. |
| 2005/0198130 | A1* | 9/2005 | Bosloy et al. ................. 709/204 |
| 2006/0159109 | A1 | 7/2006 | Lamkin et al. |
| 2006/0182103 | A1 | 8/2006 | Martini et al. |
| 2007/0115975 | A1 | 5/2007 | Zhang |
| 2007/0211734 | A1 | 9/2007 | Yang et al. |
| 2007/0217436 | A1 | 9/2007 | Markley et al. |
| 2007/0237115 | A1 | 10/2007 | Bae et al. |
| 2007/0250870 | A1 | 10/2007 | Kim et al. |
| 2008/0235358 | A1 | 9/2008 | Moribe et al. |
| 2009/0094317 | A1* | 4/2009 | Venkitaraman ............... 709/203 |
| 2009/0144338 | A1 | 6/2009 | Feng et al. |
| 2009/0292738 | A1* | 11/2009 | Hurwitz ........................ 707/200 |
| 2010/0180037 | A1 | 7/2010 | Dessart |
| 2010/0251384 | A1* | 9/2010 | Yen ................................ 726/27 |
| 2010/0325695 | A1 | 12/2010 | Suzuki |
| 2011/0066844 | A1 | 3/2011 | O'Toole, Jr. |

FOREIGN PATENT DOCUMENTS

| EP | 2 000 915 A2 | 12/2008 |
| EP | 2 000 917 A1 | 12/2008 |
| WO | 2008090519 A2 | 7/2008 |

OTHER PUBLICATIONS

Gleeson, B. et al., "A Framework for IP Based Virtual Private Networks," Feb. 2000, pp. 1-63, The Internet Society.

(Continued)

Primary Examiner — Wing Chan
Assistant Examiner — Kostas Katsikis
(74) Attorney, Agent, or Firm — Banner & Witcoff, Ltd.

(57) ABSTRACT

A media server is hosted in a service provider's network so that media content can be stored from or rendered to a private network such as a Digital Living Network Alliance (DLNA) network. Media content may be stored directly by accessing the media server or by downloading the media content to the media server. A server platform may support a set of media servers, where each media server is connected to a corresponding DLNA network. A multicast group may be established among the set of media servers so that media content may be shared with members of the multicast group. Media content may be aggregated for media content for the multicast group based on content characteristics, where the content characteristics are indicative of media content that can be shared with members of the multicast group.

48 Claims, 9 Drawing Sheets

OTHER PUBLICATIONS

Fasbender, Andreas et al., "Virtually at home: High-performance access to personal media," 2008, pp. 58-63, Ericsson Review No. 2.

Extended European Search Report from Related EP Application No. 10159921.5, mailed Jun. 22, 2010, pp. 1-2.

European Search Report from Related EP Application No. 10157953, mailed Aug. 16, 2010, pp. 1-11.

Wen, Chih-Chao et al., "Centralized Control and Management Architecture Design for PIM-SM Based IP/MPLS Multicast Networks," IEEE, 2007, pp. 443-447.

European Search Report from Related EP Application No. 10157939, mailed Aug. 16, 2010, pp. 1-11.

European Office Action for application No. 10159921.5 mailed Jun. 17, 2011.

Final office action for related U.S. Appl. No. 12/435,025 mailed Jun. 21, 2011.

Final office action for related U.S. Appl. No. 12/435,037 mailed Jul. 6, 2011.

Non-Final office action for related U.S. Appl. No. 12/435,059 mailed Apr. 13, 2011.

Non-Final Office Action for related U.S. Appl. No. 12/435,025 mailed Jan. 4, 2011.

Non-Final Office Action for related U.S. Appl. No. 12/435,037 mailed Jan. 19, 2011.

US Office Action dated Sep. 7, 2011 in corresponding U.S. Appl. No. 12/435,025.

US Office Action dated Sep. 22, 2011 in corresponding U.S. Appl. No. 12/435,037.

US Office Action dated Oct. 7, 2011 in corresponding U.S. Appl. No. 12/435,059.

* cited by examiner

SHARING MEDIA CONTENT BASED ON A MEDIA SERVER

TECHNICAL FIELD

Aspects relate to storing and rendering media content from a media server. More specifically, the media server may be located in a service provider's network and may implement protocols compliant with a Digital Living Network Alliance (DLNA).

BACKGROUND

Consumers are acquiring, managing and using digital media on multiple consumer electronic devices. Network media sources include a service provider's legacy video plant, the Internet, retail rental locations (physical DVDs), and the home network. A home network typically has consumer electronics (CE) devices such as set top boxes, DVD players, personal computers (PCs), game consoles, portable media devices, and mobile phones. Standards are evolving for content delivery, in which content portability may be achieved and made interoperable through the use of compatible devices and other video internetworking technologies. For example, the Digital Living Network Alliance (DLNA) is an international, cross-industry collaboration of consumer electronics, computing industry and mobile device companies. Members of DLNA develop a concept of wired and wireless interoperable networks where digital content such as photos, music, and videos can be shared through consumer electronics, PCs, and mobile devices in and beyond the home. The organization seeks to deliver an interoperability framework and design guidelines that become open industry standards. Current guidelines expand the capabilities of the DLNA-defined network to include more device classes and functional capabilities, including printers, mobile devices, controllers, uploaders and downloaders. The guidelines also include specifications for digital rights management.

With traditional systems, DLNA media servers (DMS) are co-resident to DLNA media players in the local network that is typically located on the customer's premises. Media content is often stored in the Internet and may not be protected by a high level of security. Media content from the Internet sources may be downloaded to a PC in order for the PC to provide the media content from a DLNA media server to other DLNA media players in the DLNA network.

Personalized services, e.g., storage of the media content and the administration of DLNA media and server capability, are typically the responsibility of the customer in the local network. However, many customers do not have a technical background and may find this responsibility difficult and burdensome. Also, playing this media content on other media players (e.g., televisions and portable media players (PMPs)) may require more hardware or software support in the home as it requires a local DLNA media server at the customer's home. Moreover, media content is often copied to a physical storage device each time the media content is shared with a user in the DLNA network. This may increase the cost to the customer and may require supporting a variety of physical storage devices.

BRIEF SUMMARY

The following presents a simplified summary of the disclosure in order to provide a basic understanding of some aspects. It is not intended to identify key or critical elements of the embodiments or to delineate the scope of the embodiments. The following summary merely presents some concepts of the disclosure in a simplified form as a prelude to the more detailed description provided below.

A media server is hosted in a service provider's network so that media content can be stored from or rendered to a private network such as a Digital Living Network Alliance (DLNA) network. Media content may be stored directly by accessing the media server or by downloading the media content to the media server.

A server platform may further support a set of media servers, where each media server is connected to a corresponding DLNA network. A multicast group may be established among the set of media servers so that media content may be shared with members of the multicast group. A content list for one of the media servers may be sent to the other media servers of the multicast group so that a member of the multicast group can access listed media content.

Media content may be aggregated with media content for the multicast group based on content characteristics, where the content characteristics are indicative of media content that can be shared with members of the multicast group. A content list of the aggregated media content may be generated so that a member may select media content from the content list.

Embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the embodiments will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
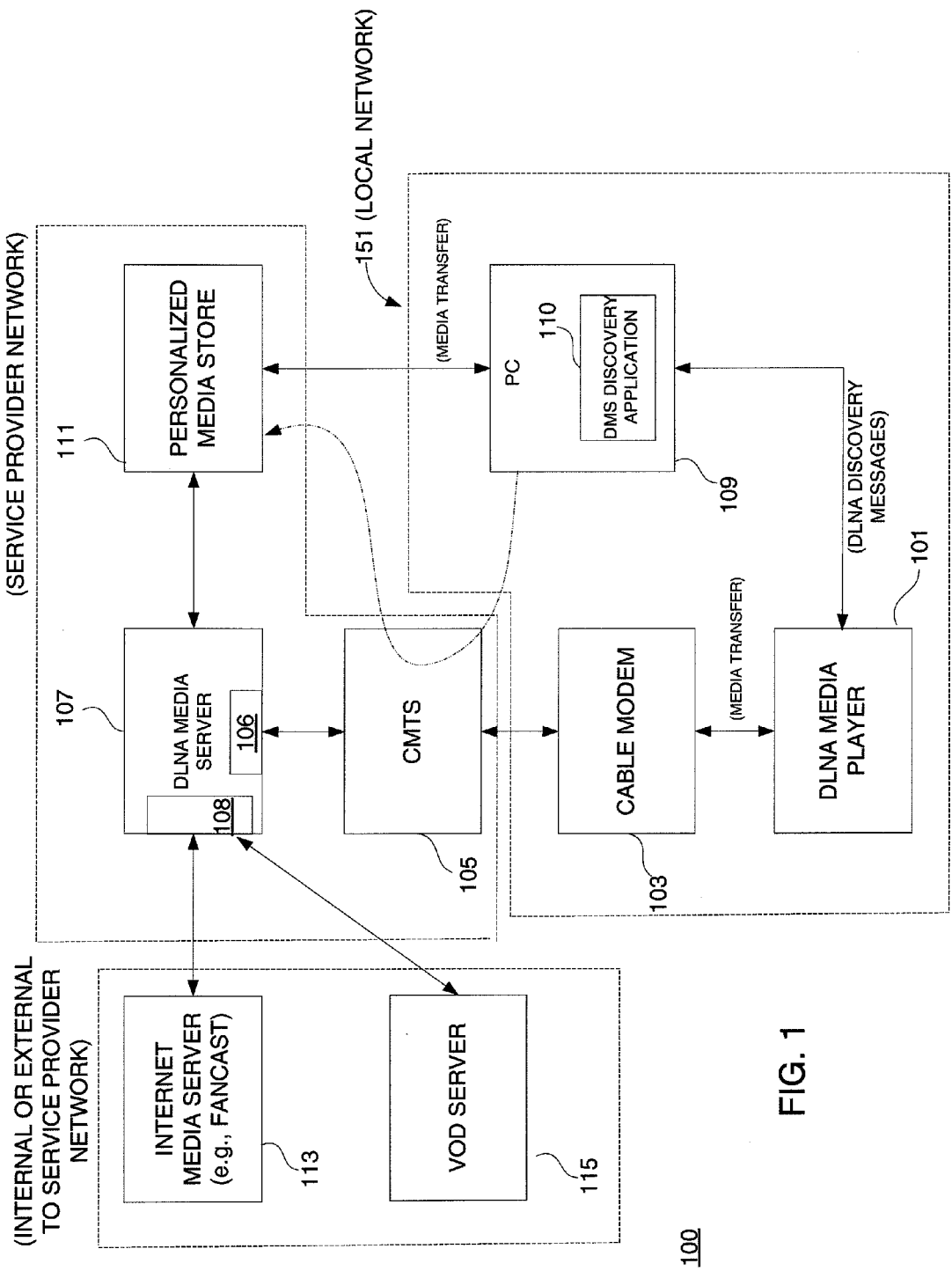
FIG. 1 illustrates a system with a media server that appears as a local media server in accordance with various aspects.

FIG. 1 shows a system 100 that supports a network such as a Digital Living Network Alliance (DLNA) network. DLNA published its first set of Interoperability Guidelines in June 2004 and the first set of DLNA Certified products began appearing in the market soon thereafter. DLNA Interoperability Guidelines, version 1.5, was published in March 2006, and then expanded in October 2006. These guidelines enlarge the capabilities of a DLNA-defined network to include more home and mobile devices. They also include the specifications for link protection to allow secure transmission of copyright-protected commercial digital content. Products are certified by passing the DLNA Certification Program. However, embodiments are not limited to version 1.5 of the DLNA Interoperability Guidelines.

DLNA media server 107 appears as a local media server in accordance with various aspects. While a DLNA media server is typically hosted at the customer (user) premises in accordance with traditional systems, DLNA media server 107 is hosted in the service provider network such as a cable network. Media server 107 may host all the personal media content for a user associated with the DLNA network, where media content may be uploaded directly from a device on the DLNA network by the user. Media server 107 may also connect to network media sources.

Figure 4:
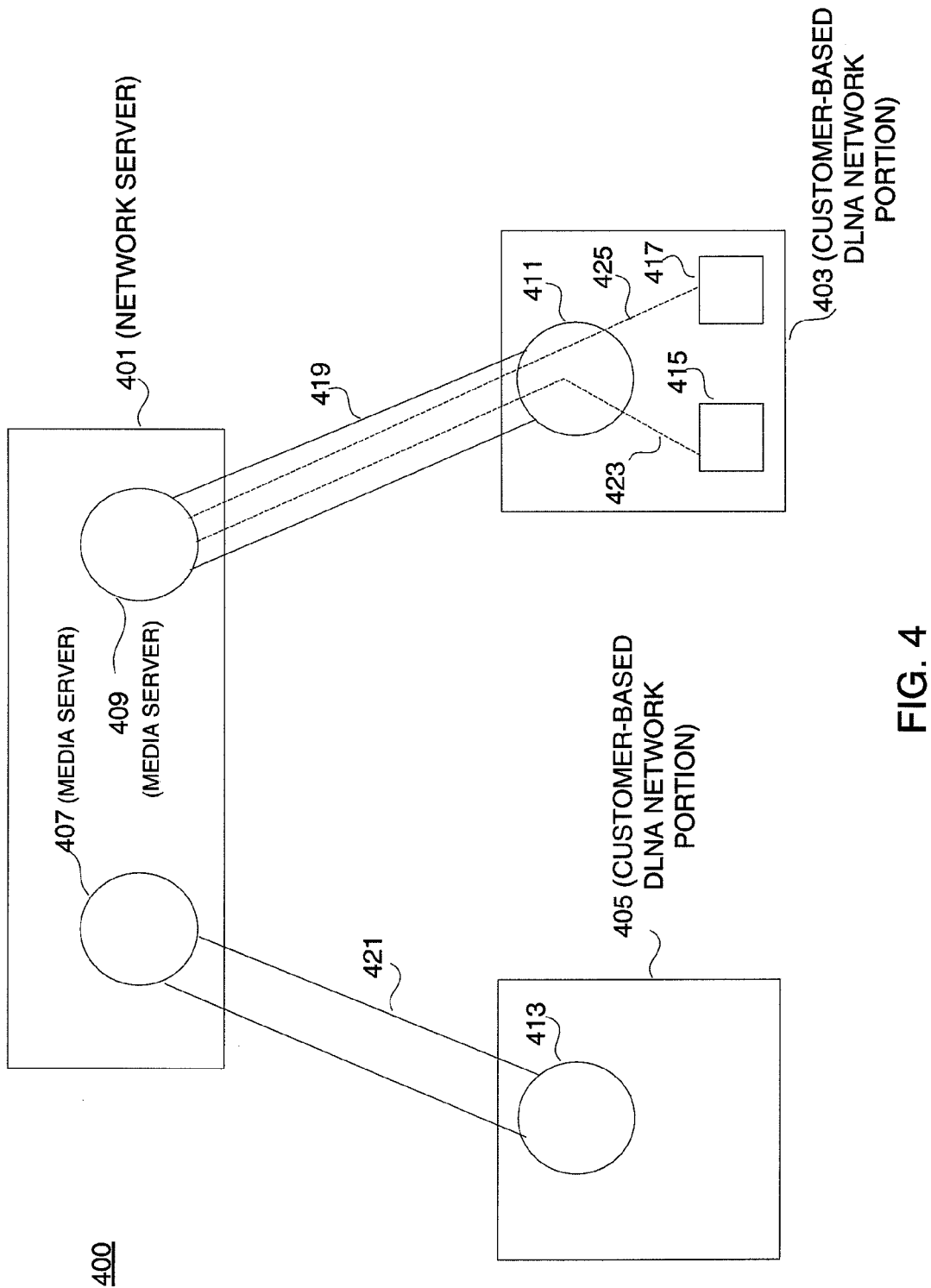
FIG. 4 shows a system with a network server supporting a plurality of DLNA networks in accordance with aspects.

As will be discussed, a hardware entity (e.g., network server 401 as shown in FIG. 4) typically supports a plurality of users in the service provider network, where each customer is associated with either a separate or virtual media server 107. Media server 107 may be referred to as a virtual media server because the media server appears to the devices on the user's physical LAN to be located in the user's private network, as will be discussed. Address mapping module 106 converts the physical address associated with media server 107 to a virtual address that is associated with a private network of the customer so that media server appears to be located within the private network (e.g., a DLNA network). For example, as will be discussed, a tunnel may be established between physical addresses while one or more sessions may be established within the tunnel using the virtual addresses.

With various aspects, a portion of the DLNA network is associated with the customer premises. The customer-based portion typically includes various DLNA devices, e.g., computer (PC) 109 and media player 101, as well as a local router (not explicitly shown in FIG. 1 but shown as router 307 in FIG. 3) that routes messages between the DLNA devices. With some embodiments, the local router may be where the tunnel between the physical device 106 and the local network 151 is terminated in the user's network With an embodiment, media server 107 is discovered through discovery application 110, which is typically implemented in the local network. Content fulfillment from the provider network and content delivery may occur through an existing cable infrastructure (e.g., cable modem termination system CMTS 105 and cable modem 103).

CMTS 105 is equipment typically found in a cable company's head-end (not shown) or at a cable company hub-site. CMTS 105 typically provides high speed data services, e.g., cable internet or Voice over IP (VoIP), to cable subscribers. In order to provide these high speed data services, a cable company often connects its head-end to the Internet via very high capacity data links to a network service provider. On the subscriber side of the network, CMTS 105 enables communication with subscribers' cable modems. Different CMTSs are typically capable of serving different cable modem population sizes ranging from 4,000 cable modems to 150,000 or more, depending in part on the amount of traffic.

A given head-end may be associated with a dozen or more CMTSs to service the cable modem population served by that head-end or hybrid fiber coax (HFC) hub. CMTS 105 typically functions as a router with Ethernet interfaces (connections) on one side and coax RF interfaces on the other side. The RF/coax interfaces may carry RF signals to and from cable modem 103. CMTS 105 typically supports high-speed data interfaces as well as RF interfaces. Consequently, traffic that is coming from the Internet (e.g., from Internet media server 113) may be routed (or bridged) through an Ethernet interface, through CMTS 105, and then onto the RF interfaces to cable modem 103.

With network-based hosting of media server 107, media content between an IP network and a broadcast network may be shared as will be further discussed. With media server 107 hosted in the provider network, media server 107 may store the personal media content of the user at personalized media store 111. The media content may be stored directly by the user by accessing server 107 securely or by downloading the media content from an external IP source (e.g., a Fancast server, which can be accessed at www.fancast.com) to media server 107. For example, a service provider (e.g., Comcast-.net) may allow a personalized web page for each of its customers, and the media content may be uploaded and categorized to the web page.

Media server 107 provides media content for a private network that is separate from the media content for another private network. For example, as shown in FIG. 4, media content for media server 407 is separately stored from media content for media server 409, in which each media server is associated with different private networks. Consequently, media server 107 may be implemented as a disaggregated DLNA media server for supporting remote fulfillment, in which media content for a private network may be locally discovered. Discovery of media server 107 and announcing of content is typically implemented within the local network (e.g., discovery application 110). This approach may reduce the number of router hops and reduce the round trip delay time during the discovery process. With some embodiments, proper operation of DLNA-compatible devices may require that DLNA discovery messages be routed with a maximum of 3 router hops and a maximum of 7 msec round trip delay time. Also, multicast messages typically are not routed from media server 107 to the local network through CMTS 105 and cable modem 103. During the DLNA discovery process, local DMS application 110 publishes the URL of media server 107 as the URL for the media content.

Some embodiments may utilize Universal Plug and Play (UPnP) to allow DLNA devices to connect seamlessly and to implement a DLNA network in the home (data sharing, communications, and entertainment) or in a corporate environment.

UPnP networking is typically based on IP addressing. Each DLNA device has a Dynamic Host Configuration Protocol (DHCP) client and searches for a DHCP server when the device is first connected to the network. If no DHCP server is available (the network is unmanaged), the DLNA device assigns itself an address. If during the DHCP transaction, a DLNA device obtains a domain name through a DNS server or via DNS forwarding, the DLNA device may use that name in subsequent network operations; otherwise, the device should use its IP address.

Given an IP address, UPnP networking further supports a discovery process. When a DLNA device is added to the network, the UPnP discovery protocol allows a DLNA device to advertise its services to control points on the network. Similarly, when a control point is added to the network, the UPnP discovery protocol allows the control point to search for devices of interest on the network. The discovery utilizes discovery messaging that may contain a device's type, identifier, and a pointer to more detailed information.

A media player (e.g., DLNA media player 101) may use the media server's URL as the destination URL and may communicate with media server 107 for the media content. Media server 107 may provide connectivity to existing media store (e.g., personalized Comcast.net web page) or implement a media store (e.g., personalized media store 111).

Although not explicitly shown, messaging between devices in a DLNA network is typically routed through a local router.

Media server 107 may connect to Internet media server 113 (e.g., a Fancast server) using Internet Protocol for content rendering over IP connectivity to CMTS 105 to share media content with downstream media players (e.g., player 101 and PC 109). With some embodiments, media server 107 may make requests of Internet media server 113 using standard web interface requests (e.g., appearing as a PC requesting content using SOAP/XML). Media server 107 then proxies the data for the player 101. Initially, media server 107 may request the catalog of content from Internet media server 113, and may present that over interface 106 using standard UPnP messages annunciating content. Media server 107 may also support additional functionality, including session management for cable modem 103, transcoding media content to an appropriate format (e.g., MPEG 2 or MPEG 4) as required by a DLNA media player, and digital rights management (DRM) for playing the content on a downstream player (e.g., Digital Transmission Content Protection over Internet Protocol (DTCP-IP)).

Media content downloading from Internet media server 113 may be supported by exporting an interface (e.g., from Fancast to the DLNA media server 107). An exemplary embodiment incorporates a web service API with Simple Object Access Protocol (XML protocol) (SOAP/XML) format to connect to the DLNA media server 107 from Internet media server 113. DLNA media server 107 may query Internet media server 113 for the media content and cache media content with an expiry timer.

With other embodiments, alternative options implement Remote Method Invocation (RMI) using a Common Object Request Broker Architecture (CORBA) on the Fancast server 113, SQL queries from media server 107 to a database associated with Internet media server 113, or screen scraping of a website that is associated with Internet media server 113.

Media content from Internet media server 113 through media server 107 may be supported with various real-time protocols including Real Time Streaming Protocol (RTSP). RTSP allows a user to remotely control a streaming media server with VCR-like commands and allows time-based access to files on media server 107.

Figure 3:
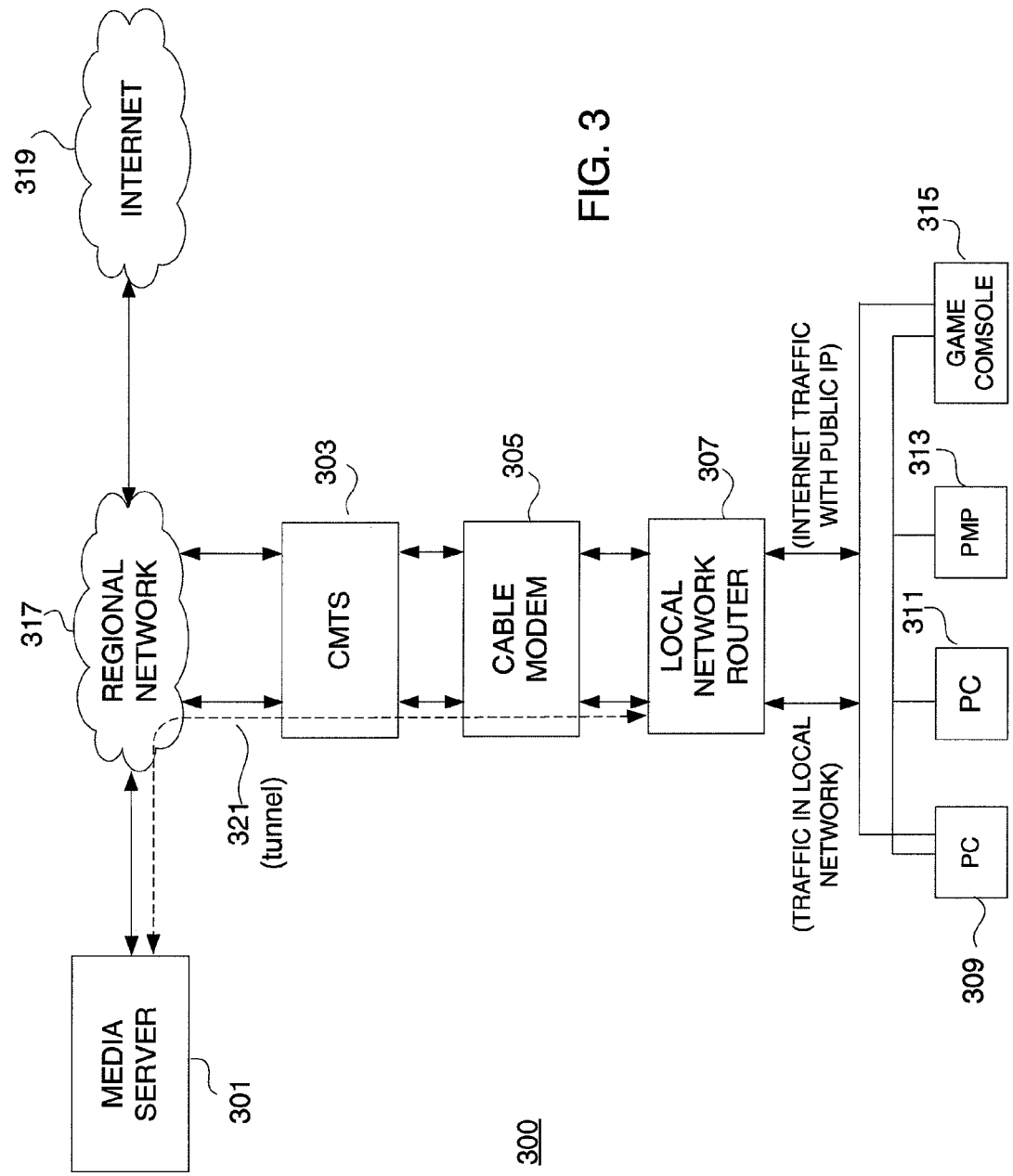
FIG. 3 shows a system in a network with tunneling flow in accordance with various aspects.

A communication channel (e.g., tunnel 321 as shown in FIG. 3) can be uniquely established from local (home) network 151 to DLNA media server 107. From the customer (end user) perspective, only one media server connects to Internet media server 113. Caching and data transfer may be maintained to provide the same user experience as that of directly connecting to Internet media server 113 or to media store 111.

System 100 may include a video on demand (VOD) server 115 to support an IP to VOD gateway application residing on a DLNA media server 107.

System 100 may be advantageous over traditional systems because additional DLNA media servers may not be needed at local network 151 (customer premises). For example, customers may buy devices with DLNA players built into them but may not have a DLNA server to access or content they wish to view in their home network. System 100 may a way for someone to have the service provider "do it for me" without having to purchase additional equipment or spend time building configuring. Personal media content is stored in the provider network media store, thus removing the need for a local storage in local network 151. Media content from Internet media server 113 and other personal media content may be directly downloaded to an IP-enabled DLNA media player because transcoding is performed by transcoder module 108 in the upstream network. Also, transcoder module 108 may perform transcoding so that IP media content may be delivered as a video on demand (VOD) through a set top box (not shown). Conversely, transcoder module 180 may perform transcoding so that a VOD media file (VOD asset) is delivered to an IP-compatible device.

Transcoder module 108 converts the format of a media file or streamed file format into an appropriate format so that a target device can properly play the converted media file based on characteristics of the target device (e.g., resolution and color display capability). Transcoder module 108 may convert video formats (i.e., MPEG-2 to MPEG-4, VHS to Quick-Time, QuickTime to MPEG). Also, transcoder module 108 may be used to fit HTML files and graphics files to the unique constraints of mobile devices and other Web-enabled products. Mobile devices often have smaller screen sizes, lower memory, and slower bandwidth rates. Transcoding may entail (changing file formats as previously discussed), transrating (lowering the screen resolution or frames per second to meet the capabilities of the player), and re-encrypting content. With some embodiments, requests made of the VOD server 115 may be of a proprietary protocol, but the Media Server 107 may know how to interface with that server and start and stream control content.

According to aspects, a media server (e.g., media server 107) may execute computer executable instructions from a computer-readable medium. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a processor.

Figure 2:
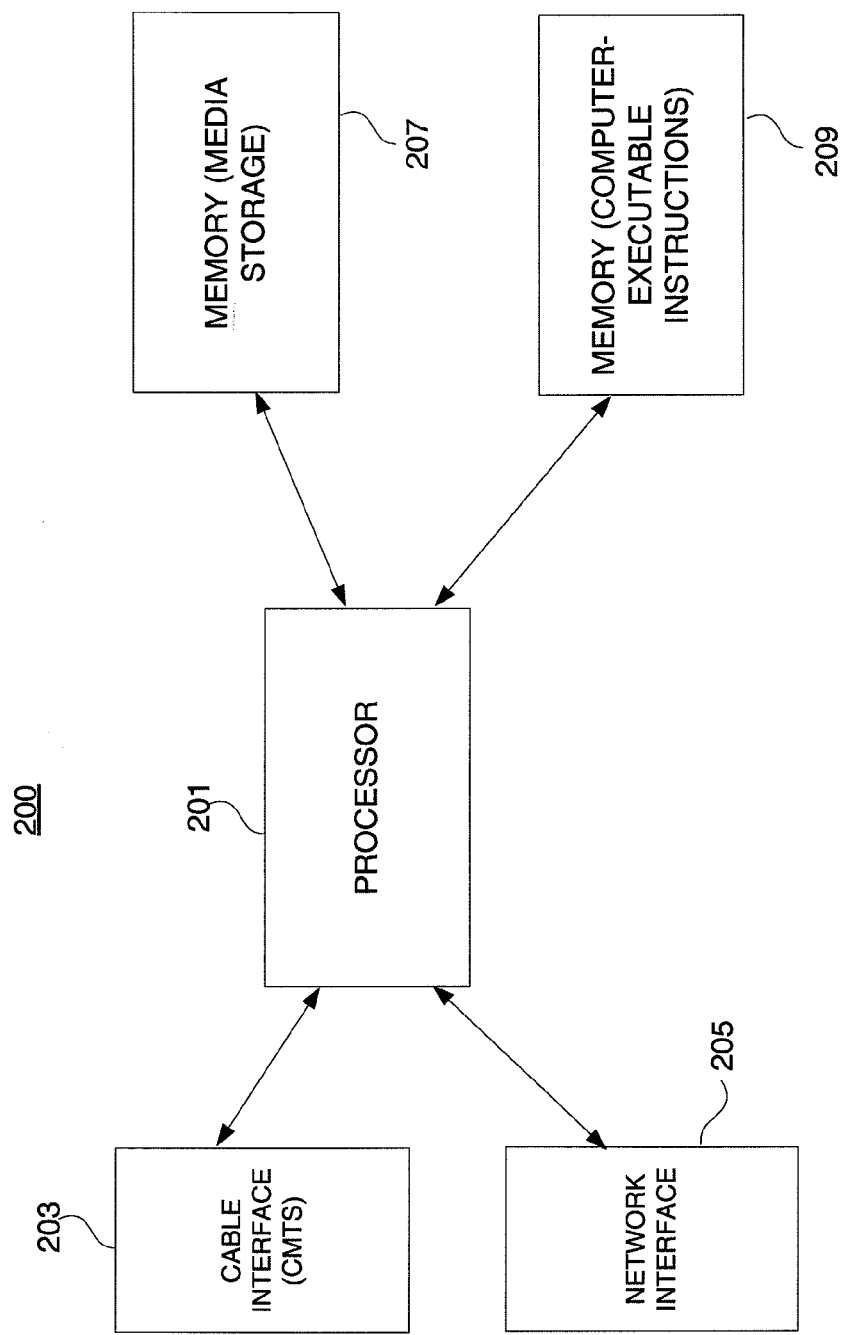
FIG. 2 shows an apparatus that supports a media server in accordance with various aspects.

FIG. 2 shows apparatus 200 that supports a media server in accordance with aspects. With some embodiments, apparatus 200 comprises a computer platform (e.g., network server 401 as shown in FIG. 4) that supports numerous media servers (e.g., media server 107), where each media server is associated with a corresponding private network.

Apparatus 200 interfaces to an external or internal network (shown including Internet media server 113 and VOD server 115 in FIG. 1) via network interface 205 typically with the Internet Protocol and cable interface 203 that communicates with supported private networks through CMTS 105.

Processor 201 provides functionalities associated with media server 107, as previously discussed, including transformation (e.g., transcoding) of media content and conversion of physical addresses to virtual addresses so that a virtual address appears to be local within a private network.

Processor 201 may execute computer executable instructions from a computer-readable medium, e.g., memory 209. Computer storage media may include volatile and nonvolatile, removable and non-removable media implemented in any method or technology for storage of information such as computer readable instructions, data structures, program modules or other data.

Apparatus 200 also includes memory 207 for storing media content. Even though personal media content may be stored in the service provider's network, the media content appears to be locally stored and discovered in the private network that is associated with the media server.

FIG. 3 shows system 300 in a network with tunneling flow in accordance with various aspects. System 300 hosts personalized server (media server) 301 in a service provider network (comprising local network router 307, cable modem 305, and CMTS 303) and connects the network with the user's local network (comprising PC 309, PC 311, portable media player (PMP) 313, and game console 315) by making the server IP address appear to be in the local network.

A communications channel may be established between media server 301 (which may be one of a plurality of media servers supported by apparatus 200) to a private network (e.g., local network 151 as shown in FIG. 1) through an Ethernet interface to CMTS 303. Consequently, CMTS 303 typically supports a coax RF connection to cable modem 305. With some embodiments, a L2TP communication tunnel may be established between media server 301 (or some sort of security endpoint in front of media server 301) and cable modem 305.

Media server 301 may be hosted in the upstream network 317 and connects with the corresponding user's local network. In a cable network, cable modem 305 is typically at the customer premises and provides the public IP for the local network. The local network is typically a private network with private IP addresses, which are not routable outside of the network.

With traditional systems, other IP enabled devices in the local network cannot communicate with any personalized servers (e.g., server 301) in the network cloud. The private IP addresses of devices 309, 311, 313, and 315 are routable within the private network only and routed to external networks via the cable modem's public IP address and by performing network address translation. Personalized services (e.g., storage of the media, the DLNA Media server capability, and so forth) with traditional systems are controlled and maintained by the user in the local network. Because personalized services are typically available only through the public Internet, it may be difficult to offer services which require processing of multicast messages for a DLNA network. Traditional cable networks typically do not route the multicast messages originated from a private network.

A network connection from local network devices to server 301 is supported so as to render various personalized services to the user. As will be further discussed, media server 301 appears to devices 309, 311, 313, and 315 to be in the local network by mapping physical addresses to virtual addresses. For example, server 301 may be assigned a physical IP address (e.g., 180.180.180.180) while the associated virtual address is within the virtual address space of the DLNA network. For example, media server 301 may have a physical IP address of 180.180.180.180 while the corresponding virtual address is 150.150.150.150, which is within the virtual address space of the DLNA network. The virtual address of media server 301 may be within an address range associated with cable modem 305. Continuing the example, the virtual addresses of devices 309, 311, 313, and 315 are 150.150.150.151, 150.150.150.152, 150.150.150.153, and 150.150.150.154, respectively. Devices 309, 311, 313, and 315 and server 301 can communicate with each other using the virtual addresses so that media server 301 appears to be local within the DLNA network.

The translation of physical to virtual addresses can be performed by processor 201, in which tunnel 321 is established between media server 301 and either cable modem 305 or local network router 307, which corresponds to an endpoint in local network 151 (as shown in FIG. 1). Embodiments can support different endpoints in a private network, including cable modem 305, local network router 307, or PC 309. Once tunnel 321 has been established, a session may be established where media server 301 is associated with a virtual address that is within the address space of cable modem 305.

In order to decrease delay times and to reduce the number of router hops, tunnel 321 is established between an endpoint in the DLNA network (e.g., local network router 307) and media server 301. Embodiments may establish a tunnel to different endpoints, including network PC 311 or cable modem 303, by using the physical addresses. Once tunnel 321 has been established, one or more sessions may be established within tunnel 321 using virtual addresses as will be further discussed. With some embodiments, establishing the tunnel is performed by using the L2TP protocol. The virtual address of the media server 301 is requested of the local router 307 after the L2TP tunnel is established.

FIG. 4 shows a system 400 with network server 401 supporting DLNA networks 403 and 405 in accordance with aspects. Network server 401 may be implemented as a server platform supporting numerous media servers (e.g., media servers 407 and 409), where each media server corresponds to a private network (e.g., a DLNA network). In order to extend the DLNA network to a media server, each DLNA network establishes a tunnel to the corresponding media server, where tunnel 419 corresponds to endpoint 411 and media server 409 and tunnel 421 corresponds to endpoint 413 and media server 407.

Once a tunnel has been established, one or more sessions may be established between a DLNA device and the corresponding media server using virtual addresses. For example, sessions 423 and 425 are established for devices 415 and 417, respectively, with media server 409.

Embodiments may use different protocols in order to establish tunnel 419. For example, embodiments may use Layer 2 Tunneling Protocol (L2TP). L2TP is a tunneling protocol used to support virtual private networks (VPNs) but does not provide encryption or confidentiality by itself. However, L2TP typically relies on an encryption protocol that it passes within tunnel 419 to provide privacy. Although L2TP acts like a data link layer 2 protocol (corresponding to the OSI model), L2TP is really a session layer 5 protocol. The entire L2TP packet, including payload and L2TP header, is sent within a UDP datagram. L2TP can support Point-to-Point Protocol (PPP) sessions (e.g., sessions 423 and 425) within L2TP tunnel 419.

IPsec can be used to secure L2TP packets by providing confidentiality, authentication, and integrity. The combination of these two protocols is generally known as L2TP/IPsec and is standardized in IETF RFC 3193. When the tunneling process is completed, L2TP packets between the endpoints are encapsulated by IPsec. Since the L2TP packet itself is wrapped and hidden within the IPsec packet, no information about the internal private network can be obtained from the encrypted packet.

L2TP with IPSec may be used to make a VPN connection between a local network device (e.g., device 415 or 417) and media server 409 that resides in media server 401. Media server 409 may be hosted in the regional network and may be routable from CMTS 303 (as shown in FIG. 3). Media server 409 assists in routing regional traffic (e.g., VOD or Fancast video) to the local network 403, thus providing a personalized network-based server to each household.

The two endpoints of an L2TP tunnel (corresponding to 409 and 411) are called the LAC (L2TP Access Concentrator) and the LNS (L2TP Network Server). The LAC is the initiator of the tunnel, while the LNS is the server, which waits for new tunnels. Once a tunnel is established, the network traffic (e.g., sessions 423 and 425) between the peers is bidirectional. Either the LAC or LNS may initiate sessions 423 and 425. L2TP tunnel 419 may extend across an entire PPP session or only across one segment of a two-segment session.

Media servers 407 and 409 support a personalized server part of the local network, but are hosted in the provider network cloud, thus providing personalized services to the user. Once the tunnel is created, the local network traffic may be routed to the upstream server. Network server 401, which is located in the service provider's network, can establish a connection for each private network through a tunnel. Network server 401 connects to multiple households, but appears as one virtual server (e.g., media servers 407 and 409) for each of the private networks.

Embodiments may also utilize a secure shell (SSH) tunneling protocol to establish tunnel 419. An SSH tunnel is an encrypted tunnel created through an SSH protocol connection. SSH tunnels may be used to tunnel unencrypted traffic over a network through an encrypted channel. To create an SSH tunnel, an SSH client is configured to forward a specified local port to a port on the remote machine. Once the SSH tunnel has been established, the user can connect to the specified local port to access the network service.

Figure 5:
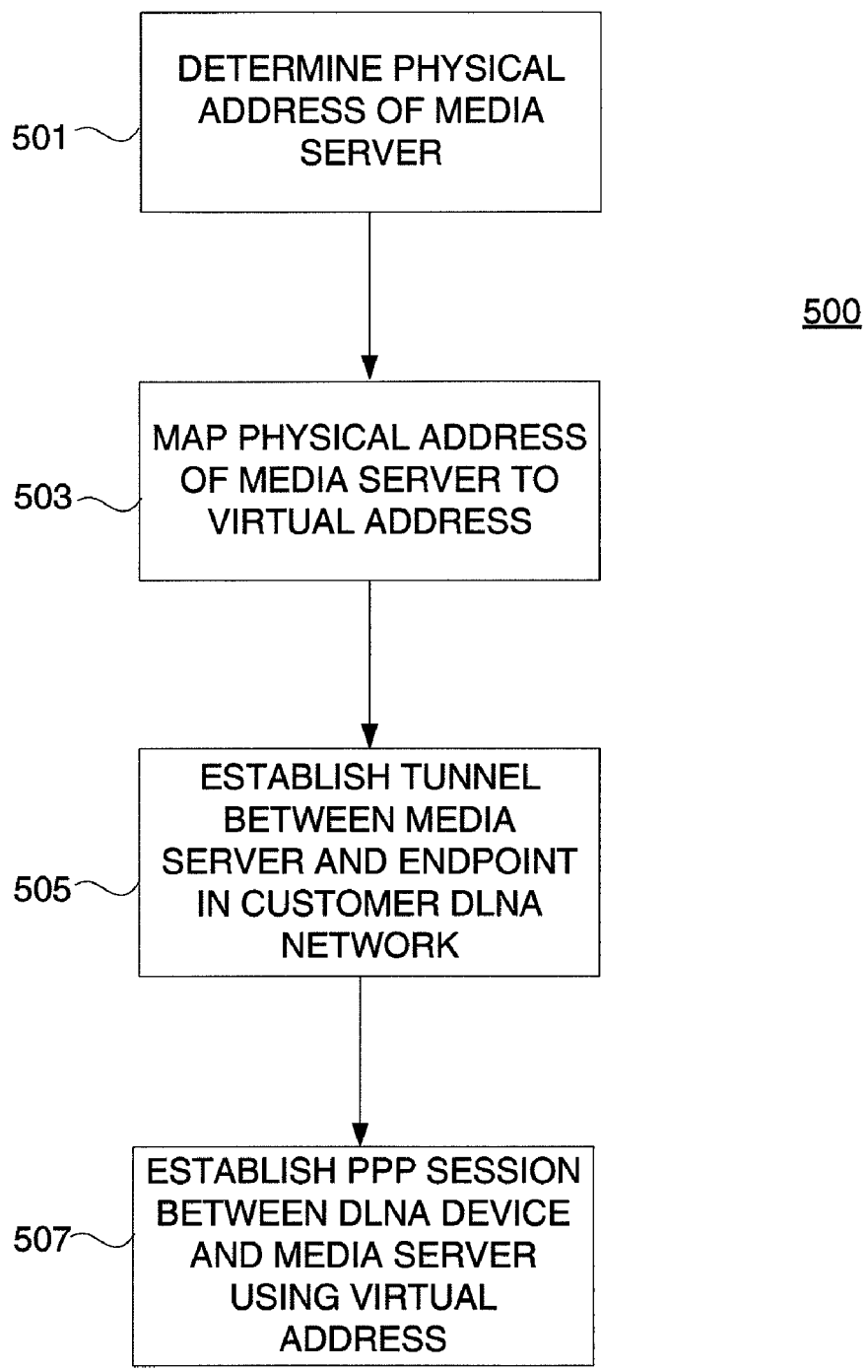
FIG. 5 shows a flow diagram that supports tunneling in accordance with aspects.

FIG. 5 shows a flow diagram 500 that supports tunneling in accordance with aspects. In step 501, the physical address of media server 409 is determined so that tunnel 419 can be established between endpoint 411 (e.g., cable modem 305, local network router 307, or PC 309 as shown in FIG. 3) and media server 409 in step 505. With some embodiments, tunnel 419 is established between arbitrary physical addresses, and then the virtual address is assigned from router 307 to media server 409 across the tunnel 419. In this way, it appears that media server 409 (from the perspective of the router and the player) is on the local network.

In step 503, the physical address of media server 409 is mapped to a virtual address so that the virtual address appears as a local address within DLNA network 403. The address mapping is performed by processor 201 (as shown in FIG. 2), which may be located in network server 401. With some embodiments, the mapping of local addresses is a function of L2TP, where all layer 2 traffic is carried across this link. The L2TP endpoint in the network may be common to all virtual sessions and may then assign a virtual server to the session. A tunnel is established in step 505 so that a session may be established to media server 409 from a DLNA device (e.g., 415 or 417). Consequently, media server 409 is treated as a local device within DLNA network 403 in step 507.

Figure 6:
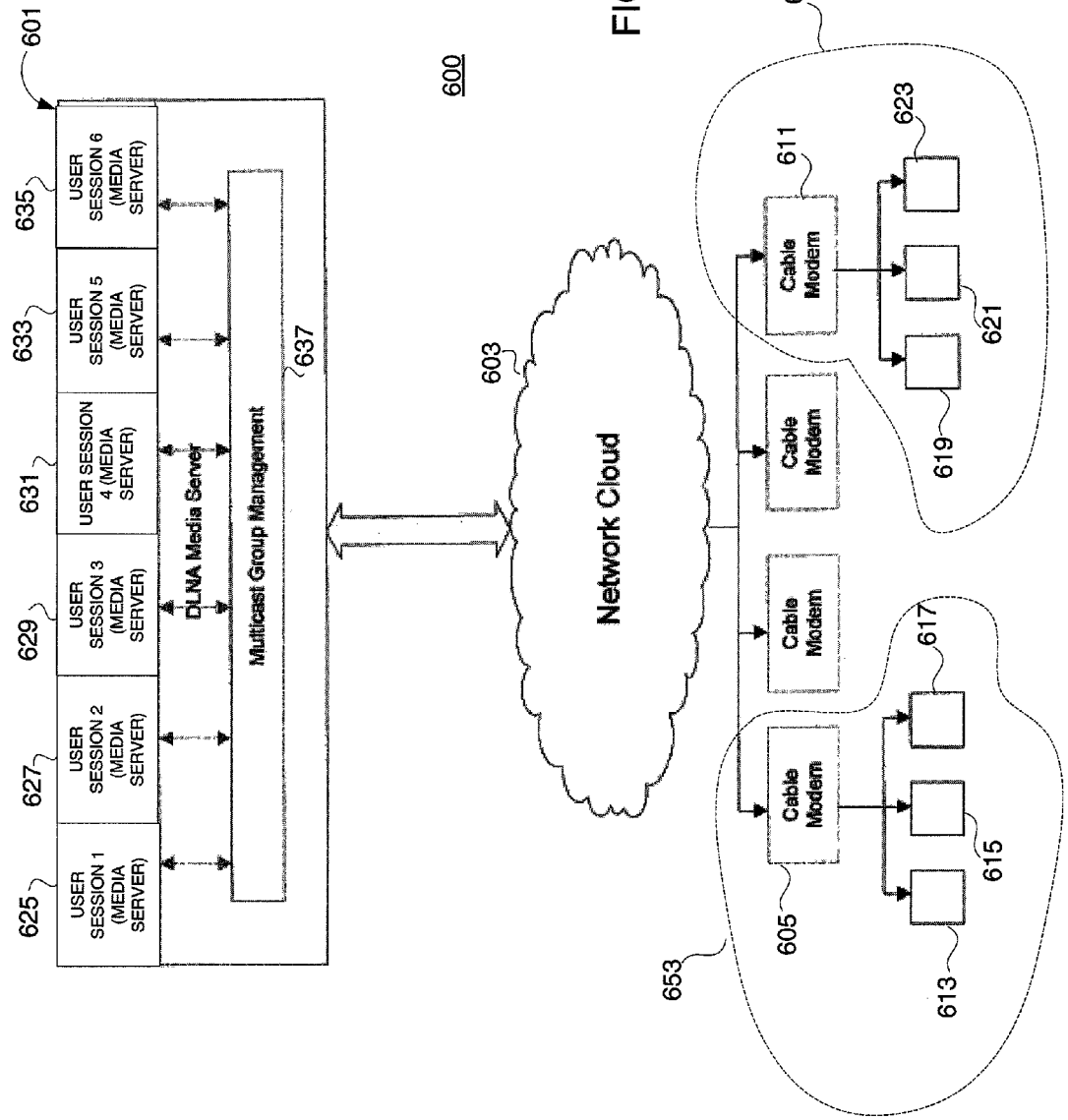
FIG. 6 shows multicast media group management for media content sharing in accordance with various aspects.

FIG. 6 shows a system 600 that supports multicast media group management for media content sharing in accordance with various aspects. Network-based media servers 625, 627, 629, 631, 633, and 635 that are implemented on server platform (network server) 601 share personalized media content for a multicast group using a network-based media server. Each user (corresponding to a media server (user session)) is able to store personalized media content. The media content may be shared with other users by making each user's media available through a multicast group. Moreover, users may subscribe to multiple media multicast groups. This approach consequently provides seamless content sharing across users through the network-based service.

A multicast group address can be used by sources and receivers to send and receive content. Sources use the multicast group address as the destination address in data packets. Receivers use the group address to inform the network that they are interested in receiving packets sent to that group. For example, if some content is associated with group address 239.1.1.1, the source sends data packets destined to 239.1.1.1. Receivers for that content inform the network that they are interested in receiving data packets sent to the group address 239.1.1.1. The receiver consequently "joins" group address 239.1.1.1. With some embodiments, it is up to the media server 107 to join a multicast group and send it down "unicast" to each DLNA client. Virtual IP address ranges may absolutely overlap. For example it is possible that all virtual addresses may be in the 192.168.0.x range.

System 600 connects DLNA networks 651 and 653 to an associated media server (625, 627, 629, 631, 633, or 635) through network 603, which comprises a service provider's infrastructure. DLNA network 651 comprises cable modem 611 and devices 619, 621, and 623 while DLNA network 653 comprises cable modem 605 and devices 613, 615, and 617. DLNA networks 651 and 653 may also include a local network router (not shown in FIG. 6).

With traditional systems, media content is shared by copying the media content to various portable devices such as DVDs, SD cards, and so forth. There may be a number of difficulties with conventional solutions. First, media content may be stored in the Internet and may not be secure enough. Also, playing media content on other media players (e.g., TVs and PMPs) typically requires more hardware or software support in the home because it requires a local DLNA media server in the home. Traditional approaches may also require that transcoding of media content to other formats be performed in the local network. Moreover, when using physical media for sharing, the media content typically needs to be copied to a physical storage device each time to share with each user. This may increase the cost to the user and may require supporting variety of physical storage devices.

With some embodiments, multicast group management function 637 shares personalized media stored in the provider's network with other users. Multicast group management function 637 may be performed by processor 201 as shown in FIG. 2. As previously discussed, tunneling with a DLNA network (e.g., DLNA network 651 or 653) enables a media server to appear as part of the DLNA network and enables media content from each user to be annunciated in a multicast group, which can be subscribed to by the other user. A user may join to or leave from the multicast group, in which a user may dynamically subscribe or unsubscribe to other user's media. The media owner can further restrict the sharing privileges by creating restrictions on the user's media group or by rejecting the restrictions to the multicast group (media group). For example, a web services layer may be supported where content can be shared. Sharing content with other users may involve creating virtual links inside the media server to share specific files or directories.

A media server of another other user interested in the media group may join or subscribe to the multicast group. Subscribing to the multicast group may be transparent to the user (e.g., the multicast group may be provisioned by the service provider) or may require explicit action by the user (e.g., through a DLNA device in response to multicast messaging advertising the multicast group). The subscribed user's media server may show media content that is shared by another user as aggregated media content to the user's media player in the downstream network.

A user may join or leave the multicast group (media group). The media owner may restrict the media to specific users by creating restrictions on the media group or by rejecting the subscriptions to the media group. This mechanism performs in a consistent manner to Internet Group Management Protocol (IGMP) for managing multicast groups. IGMP is a communications protocol often used to manage the membership of Internet Protocol multicast groups and may be used by IP hosts and adjacent multicast routers to establish multicast group memberships. IGMP is specified by documents (e.g., RFC 1112, RFC 2236, and RFC 3376) edited by the Internet Engineering Task Force (IETF).

Figure 7:
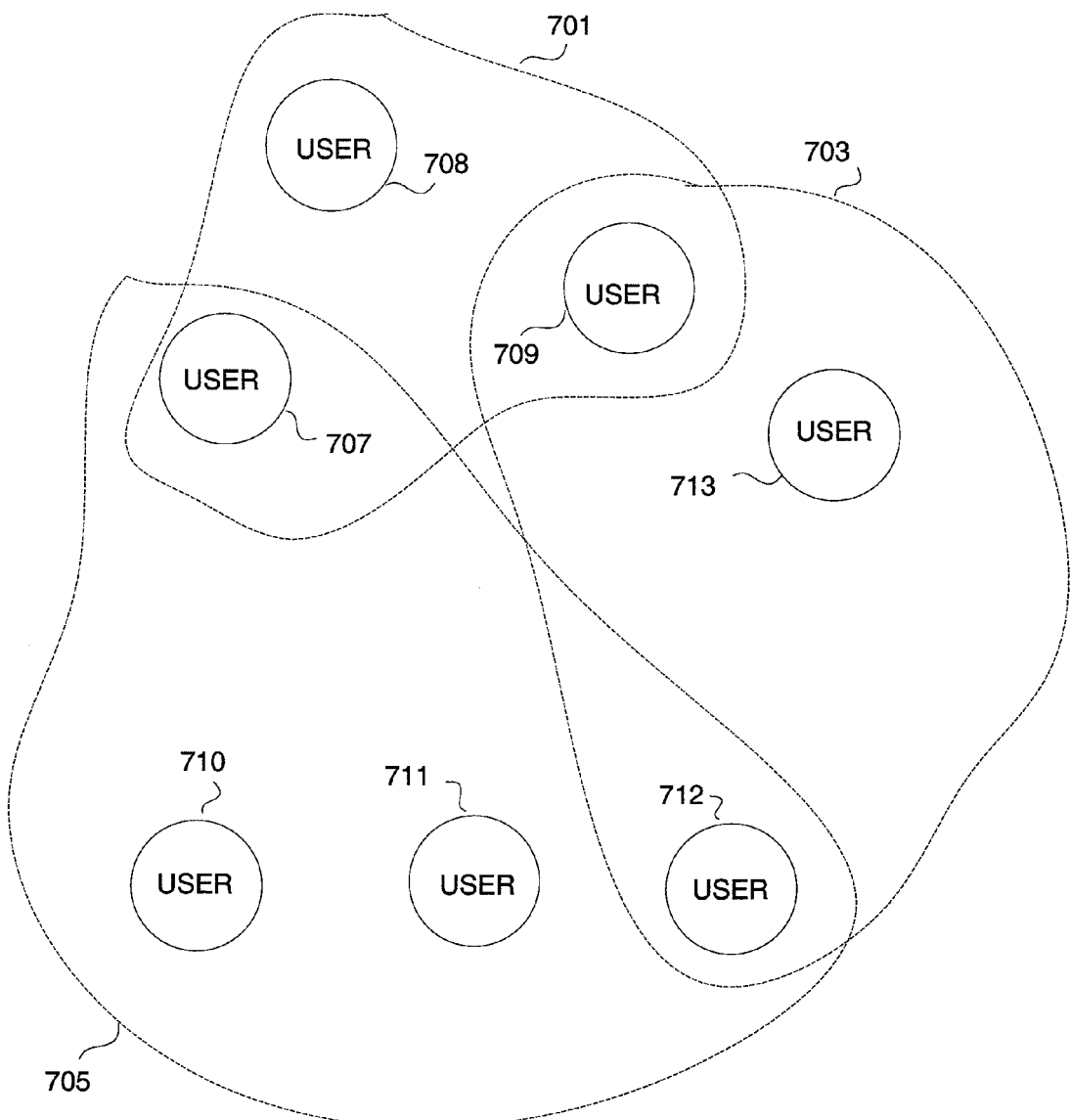
FIG. 7 shows an example of associating users with different multicast groups in accordance with various aspects.

FIG. 7 shows an example of associating users 707-713 with different multicast groups 701, 703, and 705 in accordance with various aspects. A user (corresponding to a media server) may be a member of one or more multicast groups. As exemplified by FIG. 7, user 707 is member of multicast groups 701 and 705, where each multicast group may have different restrictions. For example, multicast group 701 may include only family members while multicast group 705 may include friends. Consequently, user 707 may wish to share more personalized media (e.g., personal pictures) with members of multicast group 701 than with multicast group 705.

Figure 8:
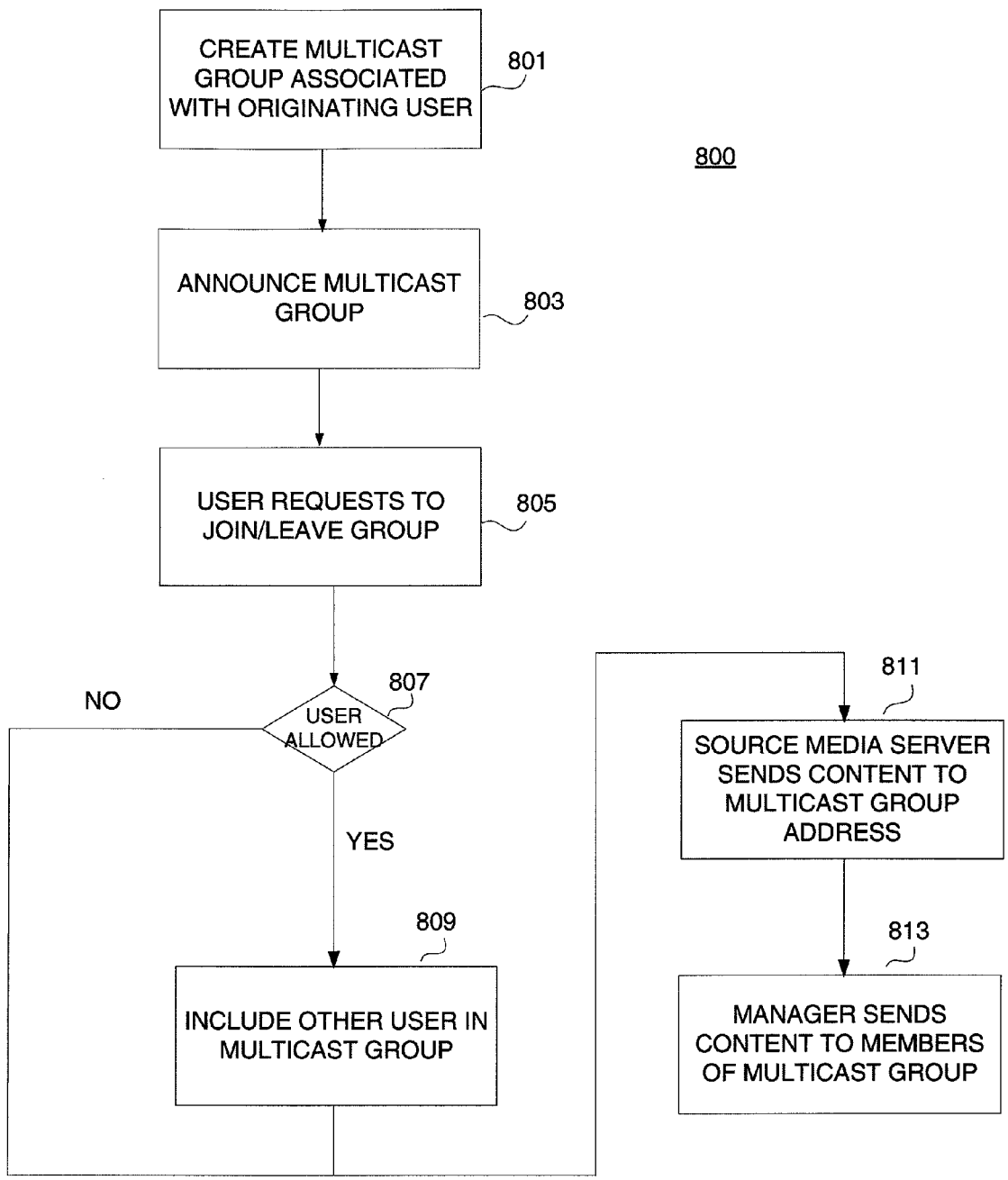
FIG. 8 shows a flow diagram that supports content messaging in accordance with various aspects.

FIG. 8 shows a flow diagram 800 that supports sharing of media content using multicast groups in accordance with various aspects. In step 801, a multicast group is created based on one of the users supported on network server 601 (as shown in FIG. 6). Creation of the multicast group may be performed implicitly by a provisioning process or may be performed in an explicit manner, in which multicast messages are sent to selected DLNA networks so that users can discover available multicast groups and may request to join a multicast group.

In step 803, the multicast group is announced to different users so that a user can request to join the group in step 805. With some embodiments, the user may explicitly discover and request membership in the multicast group by receiving messages from multicast group management function 637. With other embodiments, multicast group management function 637 may directly manage multicast membership when all of the members are supported by media servers on network server 601 without direct participation by the users in the local networks.

In step 805, a user requests to join or leave the multicast group. Multicast group management function 637 may act on behalf of the users based on provisioning information. If the user is permitted to join the multicast group, as determined in step 807, the requesting user is added to the multicast group in step 809 so that a message for the multicast group is sent to the user (e.g., the associated DLNA network if the user is explicitly involved) or to the associated media server (if multicast group management function 637 is handling multicasting on behalf of the user).

In step 811, one of the members (corresponding to the source media server) may share media content by sending the media content to the multicast group address. Consequently, in step 813 multicast group management function 637 sends the shared media content to the media servers that are associated with the multicast group.

A virtual address in a DLNA network may be converted into a multicast group address so that the multicast group appears to be local to the DLNA network by multicast group management function 637 based on provisioning of the multicast groups.

Figure 9:
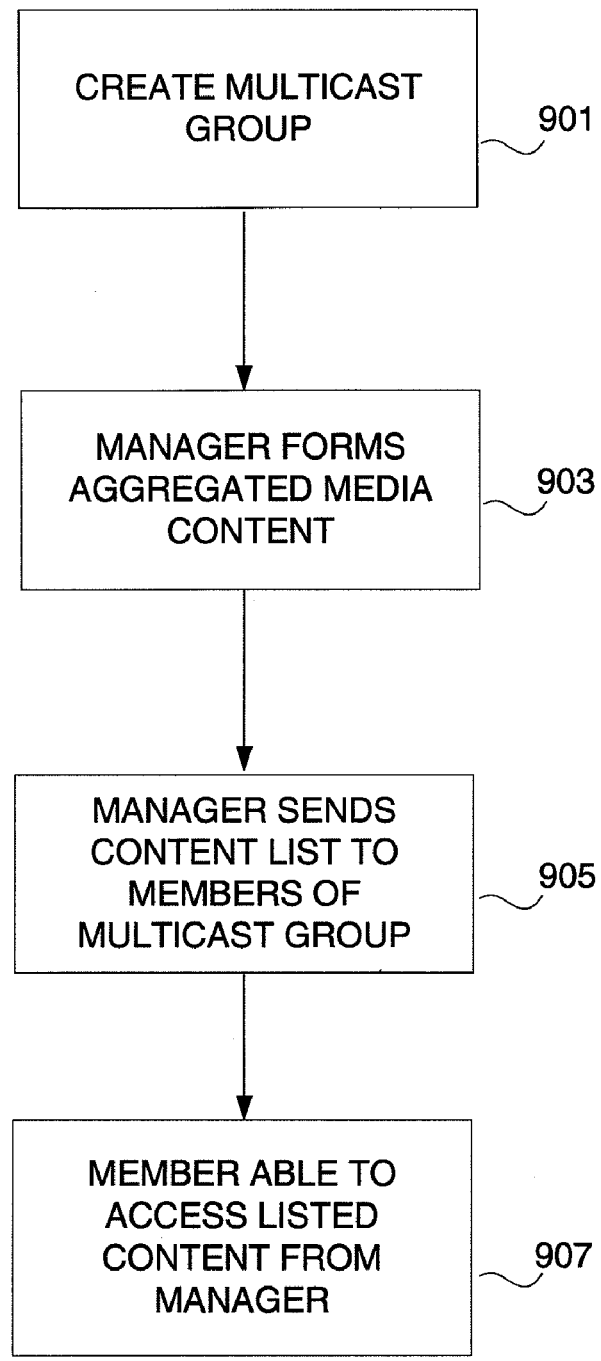
FIG. 9 shows a flow diagram that supports content messaging in accordance with various aspects.

FIG. 9 shows a flow diagram 900 that supports sharing of media content using multicast groups in accordance with various aspects. In step 901, a multicast group is created (corresponding to steps 801, 803, 805, 807, and 809 as shown in FIG. 8). Flow diagram 900 is based on flow diagram 800 and further aggregates (combines) content media content that can be shared among the members of the multicast group. Based on media restrictions for the multicast group (e.g., from provisioning information for the multicast group), multicast group management function 637 forms the aggregated media content with shared media content for the multicast group in step 903. Media content may be aggregated based on characteristics of media content. For example, members of a multicast group may not wish to share family pictures with the other members. With some embodiments, a Web application may be supported that allows users to self-classify media and the permissions surrounding that media. Rather than duplicating media content, multicast group management 937 may use pointers that address corresponding media content for a plurality of users.

In step 905, multicast group management function 637 sends the content list of aggregated media content to the members of the multicast group in step 905. Subsequently, a member can select available media content from multicast group management function 637. With some embodiments, content annunciation happens through the multicast address, while the request and access of actual content happens through the virtual IP address and not through the multicast addressing.

With some embodiments, sharing of content is accomplished through the use of one or more capabilities associated with the virtual machines in the network:

Content to be shared is made available from one virtual machine to another via a copy or link of the asset to the virtual machine associated with the party to which the content is to be shared. In this case the virtual server associated with the party with which the content is to be shared will reference directly a copy of the media or indirectly through a symbolic link.

The party with whom the media is to be shared would contact the sharing party's virtual server directly and request the content.

A third party server (e.g., a RADIUS server) would control access to each asset associated with any virtual machine in the network.

However, regardless of which implementation, there is typically a need for authentication and access control only to allow authorized parties to specific assets.

While the exemplary embodiments have been discussed in broad terms of a cable communications networking environment, some embodiments may be configured for other networking environments including telecommunications environments.

We claim:

1. An apparatus comprising:
a processor; and
memory storing computer readable instructions that, when executed by the processor, configure the apparatus to:
connect a first media server of a set of media servers to a first private network by mapping a physical address of the first media server to a first virtual address within an address space of the first private network, wherein the set of media servers is hosted by a service provider;
connect a second media server of the set of media servers to a second private network by mapping a physical address of the second media server to a second virtual address within an address space of the second private network, wherein the first media server and the second media server are each external to both the first and second private networks;

establish a multicast group including the first and second media servers; and share media content from the first media server with the second media server of the multicast group, wherein each of the first and second private networks comprise a Digital Living Network Alliance (DLNA) network.

2. The apparatus of claim 1, wherein the processor is further configured to:

announce the multicast group to a plurality of other media servers in the set of media servers that are supported by the apparatus.

3. The apparatus of claim 1, wherein the processor is further configured to:

send a content list of said first media server to the other media servers of the multicast group, wherein the content list is indicative of media content associated with said first media server.

4. The apparatus of claim 3, wherein the processor is further configured to:

provide access to listed media content when requested by a requesting media server, wherein the requesting media server is a member of the multicast group.

5. The apparatus of claim 1, wherein the processor is further configured to:

aggregate media content for the multicast group based on content characteristics, wherein the content characteristics are indicative of media content that can be shared with members of the multicast group.

6. The apparatus of claim 5, wherein the processor is further configured to:

provision the set of media servers in accordance with the content characteristics.

7. The apparatus of claim 5, wherein the processor aggregates the media content without intervention from the first and second private networks.

8. The apparatus of claim 1, wherein a multicast group address of the multicast group is local to one of the first and second private networks.

9. The apparatus of claim 8, wherein the processor is further configured to:

convert a virtual address in each private network into the multicast group address.

10. The apparatus of claim 1, wherein the establishing and the sharing are based on an Internet Group Management Protocol (IGMP).

11. The apparatus of claim 1, wherein the sharing comprises:

determining a pointer to the selected media content without duplicating, the selected media content.

12. The apparatus of claim 5, wherein the processor is further configured to:

generate a content list of the aggregated media content;

receive at least one content selection from the content list; and provide selected media content based on the at least one content selection.

13. The apparatus of claim 1, wherein the multicast group shares the media content across private networks that are behind different cable modems.

14. The apparatus of claim 1, wherein the processor is further configured to:

receive a request from a subscriber to join the multicast group; and add the subscriber to the multicast group.

15. The apparatus of claim 1, wherein the processor is further configured to:

receive a request from a subscriber to leave the multicast group; and remove the subscriber from the multicast group.

16. A computer-implemented method comprising:

connecting a first media server of a set of media servers to a first private network, wherein the set of media servers is hosted by a service provider, and wherein said first media server is external to the first private network and a second private network, while appearing to be located in the first private network based on a first virtual address mapped to a physical address of the first media server;

connecting a second media server of the set of media servers to a second private network, wherein said second media server is external to the first private network and the second private network, while appearing to be located in the second private network based on a second virtual address mapped to a physical address of the second media server;

establishing a multicast group including the first and second media servers; and sharing media content from the first media server with the second media server of the multicast group, wherein each of the first and second private networks comprise a Digital Living Network Alliance (DLNA) network.

17. The method of claim 16, further comprising:

announcing the multicast group to a plurality of media servers.

18. The method of claim 16, further comprising:

sending a content list of said first media server to the other media servers of the multicast group, wherein the content list is indicative of media content associated with said first media server.

19. The method of claim 18, further comprising:

providing access to listed media content when requested by a requesting media server, wherein the requesting media server is a member of the multicast group.

20. The method of claim 16, further comprising:

aggregating media content for the multicast group based on content characteristics, wherein the content characteristics are indicative of media content that can be shared with members of the multicast group.

21. The method of claim 20, further comprising:

provisioning the set of media servers in accordance with the content characteristics.

22. The method of claim 20, wherein the aggregating occurs without intervention from the first and second private networks.

23. The method of claim 16, wherein a multicast group address of the multicast group is local to one of the first and second private networks.

24. The method of claim 23, further comprising:

converting a virtual address in each private network into the multicast group address.

25. The method of claim 16, wherein the establishing and the sharing are based on an Internet Group Management Protocol (IGMP).

26. The method of claim 16, further comprising:

determining a pointer to the selected media content without duplicating the selected media content.

27. The method of claim 20, further comprising:
generating a content list of the aggregated media content;
receiving at least one content selection from the content list; and
providing selected media content based on the at least one content selection.

28. The method of claim 16, wherein the multicast group shares the media content across private networks that are behind different cable modems.

29. The method of claim 16, further comprising:
receiving a request from a subscriber to join the multicast group; and
adding the subscriber to the multicast group.

30. The method of claim 16, further comprising:
receiving a request from a subscriber to leave the multicast group; and
removing the subscriber from the multicast group.

31. A non-transitory computer-readable medium comprising computer-executable instructions that when executed cause a computer device to perform a method comprising:
connecting a first media server of a set of media servers to a first private network, wherein the set of media servers is hosted by a service provider, and wherein said first media server is external to the first private network and a second private network, while appearing to be located in the first private network based on a first virtual address mapped to a physical address of the first media server;
connecting a second media server of the set of media servers to a second private network, wherein said second media server is external to the first private network and the second private network, while appearing to be located in the second private network based on a second virtual address mapped to a physical address of the second media server;
establishing a multicast group including the first and second media servers; and
sharing media content from the first media server with the second media server of the multicast group, wherein each of the first and second private networks comprise a Digital Living Network Alliance (DLNA) network.

32. The computer-readable medium of claim 31, wherein the instructions further cause the computer device to perform:
announcing the multicast group to a plurality of media servers.

33. The computer-readable medium of claim 31, wherein the instructions further cause the computer device to perform:
sending a content list of said first media server to the other media servers of the multicast group, wherein the content list is indicative of media content associated with said first media server.

34. The computer-readable medium of claim 33, wherein the instructions further cause the computer device to perform:
providing access to listed media content when requested by a requesting media server, wherein the requesting media server is a member of the multicast group.

35. The computer-readable medium of claim 31, wherein the instructions further cause the computer device to perform:
aggregating media content for the multicast group based on content characteristics, wherein the content characteristics are indicative of media content that can be shared with members of the multicast group.

36. The computer-readable medium of claim 35, wherein the instructions further cause the computer device to perform:
provisioning the set of media servers in accordance with the content characteristics.

37. The computer-readable medium of claim 35, wherein the aggregating occurs without intervention from the first and second private networks.

38. The computer-readable medium of claim 31, wherein a multicast group address of the multicast group is local to one of the first and second private networks.

39. The computer-readable medium of claim 38, wherein the instructions further cause the computer device to perform:
converting a virtual address in each private network into the multicast group address.

40. The computer-readable medium of claim 31, wherein the establishing and the sharing are based on an Internet Group Management Protocol (IGMP).

41. The computer-readable medium of claim 31, wherein the instructions further cause the computer device to perform:
determining a pointer to the selected media content without duplicating the selected media content.

42. The computer-readable, medium of claim 35, wherein the instructions further cause the computer device to perform:
generating a content list of the aggregated media content;
receiving at least one content selection from the content list; and
providing selected media content based on the at least one content selection.

43. The computer-readable medium of claim 31, wherein the multicast group shares the media content across private networks that are behind different cable modems.

44. The computer-readable medium of claim 31, wherein the instructions further cause the computer device to perform:
receiving a request from a subscriber to join the multicast group; and
adding the subscriber to the multicast group.

45. The computer-readable medium of claim 31, wherein the instructions further cause the computer device to perform:
receiving a request from a subscriber to leave the multicast group; and
removing the subscriber from the multicast group.

46. An apparatus comprising:
a processor; and
memory storing computer readable instructions that, when executed by the processor, configure the apparatus to:
connect a first media server of a set of media servers to a first private network, said first media server storing first media content for the first private network, and said first media server being external to the first private network and a second private network, while appearing to be located in the first private network based on a first virtual address mapped to a physical address of the first media server;
connect a second media server of the set of media servers to the second private network, said second media server storing second media content for the second private network, and said second media server being external to the second private network and the first private network, while appearing to be located in the second private network based on a second virtual address mapped to a physical address of the second media server;
establish a multicast group including the first and second media servers; and
share media content between the first media server and the second media server using the multicast group, wherein the establishing and the sharing are based on an Internet Group Management Protocol (IGMP).

47. The apparatus of claim 46, wherein the first and second media servers are logical servers hosted by the apparatus, said apparatus located at a service provider.

48. The apparatus of claim 46, wherein said computer readable instructions, when executed, further configure the apparatus to:

receive a request for shared content from the first private network, said shared content associated with the second media server; and sending the shared content from the second media server to the first private network without accessing the second private network.

* * * * *